US011900687B2

(12) United States Patent
Choi et al.

(10) Patent No.: US 11,900,687 B2
(45) Date of Patent: Feb. 13, 2024

(54) FISHEYE COLLAGE TRANSFORMATION FOR ROAD OBJECT DETECTION OR OTHER OBJECT DETECTION

(71) Applicant: Canoo Technologies Inc., Torrance, CA (US)

(72) Inventors: Jongmoo Choi, Gardena, CA (US); David R. Arft, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

(21) Appl. No.: 17/807,315

(22) Filed: Jun. 16, 2022

(65) Prior Publication Data
US 2023/0016304 A1 Jan. 19, 2023

Related U.S. Application Data

(60) Provisional application No. 63/218,784, filed on Jul. 6, 2021.

(51) Int. Cl.
| | | |
|---|---|---|
| G06V 20/58 | (2022.01) | |
| G06V 10/25 | (2022.01) | |
| G06V 10/24 | (2022.01) | |
| G06T 5/00 | (2006.01) | |
| G06V 10/44 | (2022.01) | |
| G06T 3/40 | (2006.01) | |
| G06T 5/20 | (2006.01) | |
| G06V 10/774 | (2022.01) | |

(52) U.S. Cl.
CPC ............... G06V 20/58 (2022.01); G06T 3/40 (2013.01); G06T 3/4038 (2013.01); G06T 5/006 (2013.01); G06T 5/20 (2013.01); G06V 10/242 (2022.01); G06V 10/247 (2022.01); G06V 10/25 (2022.01); G06V 10/44 (2022.01); G06V 10/774 (2022.01)

(58) Field of Classification Search
None
See application file for complete search history.

(56) References Cited

U.S. PATENT DOCUMENTS 9,736,374 B2 * 8/2017 Wu .................... G06V 20/52
11,468,285 B1 * 10/2022 Tang ................. B60W 60/0027
11,756,260 B1 * 9/2023 Ponce .................... G06T 15/20
345/419

(Continued)

OTHER PUBLICATIONS

International Search Report and Written Opinion of the International Searching Authority dated Oct. 12, 2022, in connection with International Application No. PCT/US2022/033839, 21 pages.

(Continued)

Primary Examiner — Randolph I Chu

(57) ABSTRACT

A method includes obtaining a fisheye image of a scene and identifying multiple regions of interest in the fisheye image. The method also includes applying one or more transformations to transform and rotate one or more of the regions of interest in the fisheye image to produce one or more transformed regions. The method further includes generating a collage image having at least one portion based on the fisheye image and one or more portions containing the one or more transformed regions. In addition, the method includes performing object detection to identify one or more objects captured in the collage image.

33 Claims, 11 Drawing Sheets

(56) References Cited

U.S. PATENT DOCUMENTS

| | | | |
|---|---|---|---|
| 2010/0002070 A1* | 1/2010 | Ahiska | H04N 23/81 |
| | | | 348/E7.001 |
| 2014/0184646 A1* | 7/2014 | Liu | G06T 11/00 |
| | | | 345/634 |
| 2016/0300113 A1 | 10/2016 | Molin et al. | |
| 2018/0089795 A1* | 3/2018 | Song | G06T 3/0018 |
| 2018/0167613 A1* | 6/2018 | Hannuksela | H04N 19/167 |
| 2018/0181196 A1* | 6/2018 | Lee | H04N 23/683 |
| 2018/0199024 A1* | 7/2018 | Yip | H04N 13/178 |
| 2019/0222755 A1* | 7/2019 | Jeong | G06F 3/04886 |
| 2019/0222822 A1* | 7/2019 | Wang | G06F 16/282 |
| 2019/0272618 A1* | 9/2019 | Boyce | G06T 3/0062 |
| 2019/0273903 A1* | 9/2019 | Chan | H04N 13/111 |
| 2019/0362163 A1* | 11/2019 | Siegemund | G06V 20/58 |
| 2020/0107008 A1* | 4/2020 | Hur | H04N 13/282 |
| 2021/0037231 A1* | 2/2021 | Masuda | H04N 13/122 |
| 2021/0162994 A1 | 6/2021 | Shalev-Shwartz et al. | |
| 2021/0377581 A1* | 12/2021 | Denoual | H04N 21/23439 |
| 2022/0116544 A1* | 4/2022 | Gamadia | H04N 23/90 |
| 2022/0253988 A1* | 8/2022 | Miles | G06T 3/0018 |

OTHER PUBLICATIONS

Schwalbe, "Geometric Modelling and Calibration of Fisheye Lens Camera Systems," ResearchGate, International Archives of the Photogrammetry, Remote Sensing and Spatial Information Sciences, May 2012, 7 pages.

Krizhevsky, et al., "ImageNet Classification with Deep Convolutional Neural Networks," NeurIPS Proceedings, Advances in Neural Information Processing Systems, Jan. 2012, 9 pages.

Open Source Computer Vision, "Fisheye camera model," 13 pages.

Glasbey, et al., "A review of image warping methods," Journal of Applied Statistics, 25, 1998, 18 pages.

Ren, et al., "Faster R-CNN: Towards Real-Time Object Detection with Region Proposal Networks," IEEE Transactions on Pattern Analysis and Machine Intelligence, vol. 39, No. 6, Jun. 2017, 13 pages.

Agarwal, et al., "A Survey of Planar Homography Estimation Techniques," ResearchGate, 2008, 25 pages.

\* cited by examiner

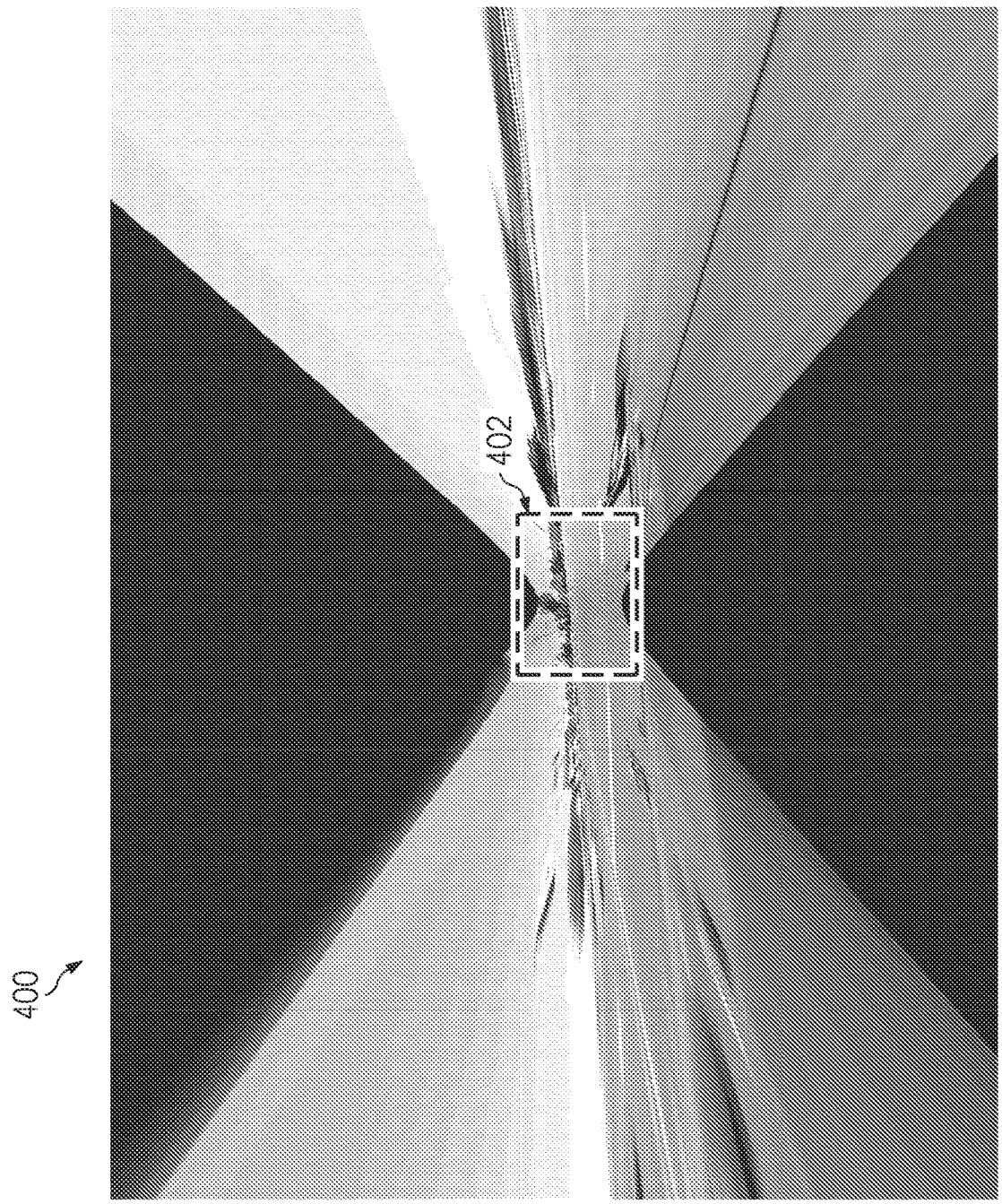

FISHEYE COLLAGE TRANSFORMATION FOR ROAD OBJECT DETECTION OR OTHER OBJECT DETECTION

CROSS-REFERENCE TO RELATED APPLICATION AND PRIORITY claim

This application claims priority under 35 U.S.C. § 119(e) to U.S. Provisional Patent Application No. 63/218,784 filed on Jul. 6, 2021, This provisional application is hereby incorporated by reference in its entirety.

TECHNICAL FIELD

This disclosure relates generally to object detection systems. More specifically, this disclosure relates to a fisheye collage transformation for road object detection or other object detection.

BACKGROUND

Identifying nearby, moving, or other objects in a scene is often an important or useful function in many autonomous applications, such as in vehicles supporting advanced driving assist system (ADAS) or autonomous driving (AD) features, or other applications. In these and other applications, it is often necessary or desirable to have awareness of the surrounding environment, such as by having a 360° or other large field of view (FOV). A camera is one type of sensor that can provide rich semantic information about objects in a scene, such as object classes and inferred three-dimensional (3D) object structures. However, it is difficult to cover an entire 360° or other large field of view using a single camera because of the physics of using a flat imaging sensor. While a multi-camera system with a set of cameras having different narrower fields of view may be used to cover a wider scene, the use of multiple cameras can be expensive, and accurate calibration of the entire camera system can be computationally expensive.

SUMMARY

This disclosure provides a fisheye collage transformation for road object detection or other object detection.

In a first embodiment, a method includes obtaining a fisheye image of a scene and identifying multiple regions of interest in the fisheye image. The method also includes applying one or more transformations to transform and rotate one or more of the regions of interest in the fisheye image to produce one or more transformed regions. The method further includes generating a collage image having at least one portion based on the fisheye image and one or more portions containing the one or more transformed regions. In addition, the method includes performing object detection to identify one or more objects captured in the collage image.

In a second embodiment, an apparatus includes at least one processor configured to obtain a fisheye image of a scene and identify multiple regions of interest in the fisheye image. The at least one processor is also configured to apply one or more transformations to transform and rotate one or more of the regions of interest in the fisheye image to produce one or more transformed regions. The at least one processor is further configured to generate a collage image having at least one portion based on the fisheye image and one or more portions containing the one or more transformed regions. In addition, the at least one processor is configured to perform object detection to identify one or more objects captured in the collage image.

In a third embodiment, a non-transitory machine-readable medium contains instructions that when executed cause at least one processor to obtain a fisheye image of a scene and identify multiple regions of interest in the fisheye image. The medium also contains instructions that when executed cause the at least one processor to apply one or more transformations to transform and rotate one or more of the regions of interest in the fisheye image to produce one or more transformed regions. The medium further contains instructions that when executed cause the at least one processor to generate a collage image having at least one portion based on the fisheye image and one or more portions containing the one or more transformed regions. In addition, the medium contains instructions that when executed cause the at least one processor to perform object detection to identify one or more objects captured in the collage image.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 4A and 4B illustrate an example transformation for isolating a central portion of a fisheye image during a fisheye collage transformation for object detection according to this disclosure;

DETAILED DESCRIPTION

Figure 1:
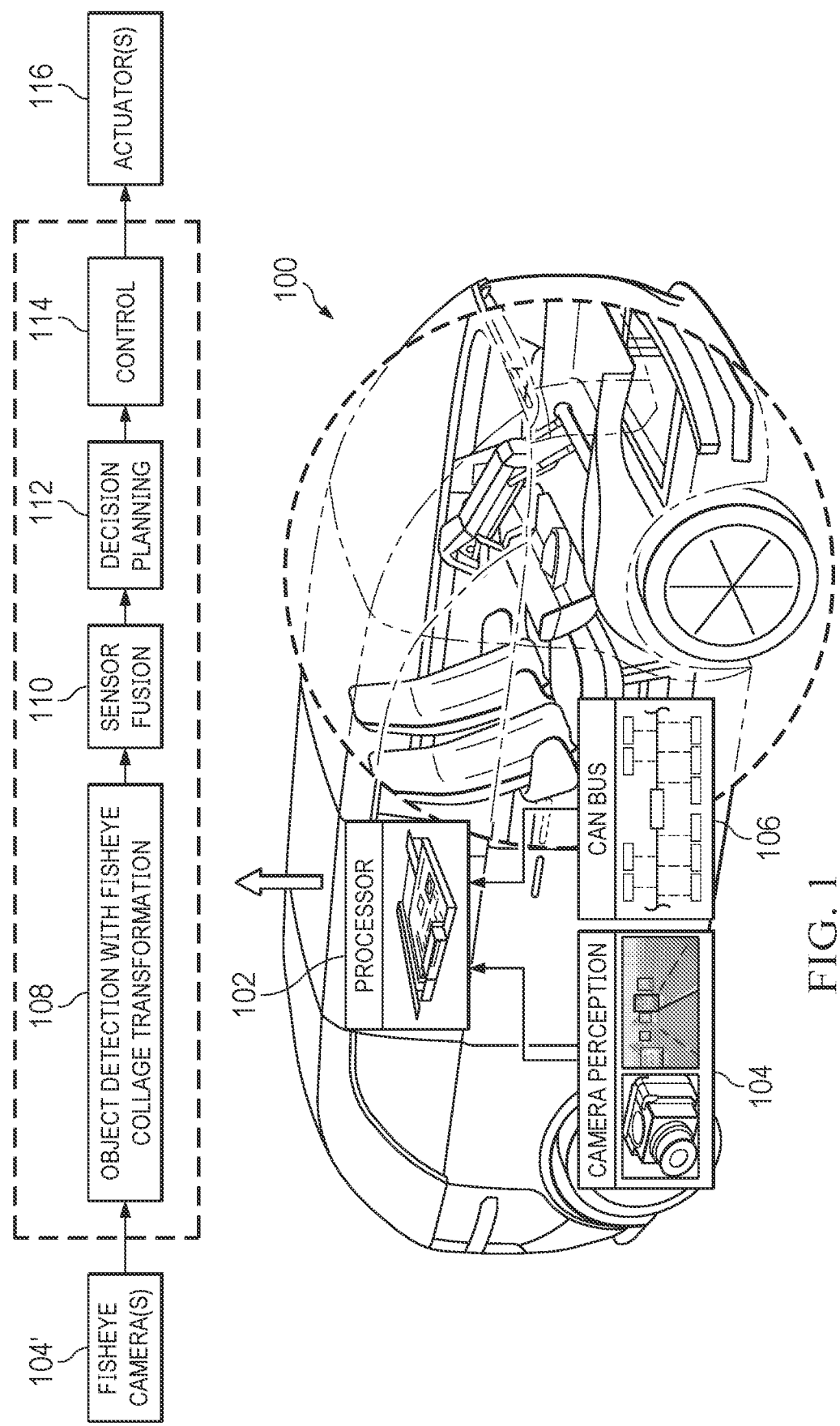
FIG. 1 illustrates an example system supporting a fisheye collage transformation for object detection according to this disclosure.

FIGS. 1 through 9, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, identifying nearby, moving, or other objects in a scene is often an important or useful function in many autonomous applications, such as in vehicles supporting advanced driving assist system (ADAS) or autonomous driving (AD) features, or other applications. In these and other applications, it is often necessary or desirable to have awareness of the surrounding environment, such as by having a 360° or other large field of view (FOV). A camera is one type of sensor that can provide rich semantic information about objects in a scene, such as object classes and inferred three-dimensional (3D) object structures. However, it is difficult to cover an entire 360° or other large field of view using a single camera because of the physics of using a flat imaging sensor. While a multi-camera system with a set of cameras having different narrower fields of view may be used to cover a wider scene, the use of multiple cameras can be expensive, and accurate calibration of the entire camera system can be computationally expensive.

A "fisheye" lens is a particular type of ultra-wide-angle lens that may be used to capture a wider field of view compared to conventional lenses, but cameras using fisheye lenses produce images having strong visual distortions. More specifically, a camera using a fisheye lens produces images having a convex non-rectilinear appearance, meaning straight lines in the images appear as curved lines. This effect is more pronounced at farther distances from centers of the images. Thus, while "fisheye" lenses might be useful in achieving larger fields of view in a camera system, the resulting images are highly distorted and need to be post-processed in order to obtain useful images.

Unfortunately, post-processing techniques for images captured using fisheye lenses tend to suffer from various shortcomings. For example, some approaches control the effective focal length of a virtual camera in order to apply a transformation to a fisheye image. However, this approach requires a trade-off between resolution and scene coverage. As a result, viewing the entire scene in a transformed image involves low resolution, or high resolution in a transformed image is limited to a portion of a scene. In the former case, it may be difficult to view object details or object boundaries in the scene. In the latter case, contents of the scene outside the portion of the scene are lost. Because of these and other issues, many autonomous systems typically use expensive and complex multi-camera systems or perform computationally-expensive algorithmic processing to process fisheye images.

This disclosure provides techniques for processing fisheye images for use in ADAS, AD, or other applications. As described in more detail below, a fisheye image of a scene can be captured and provided to a processing pipeline. The processing pipeline includes an object detection function that applies a fisheye collage transformation to the fisheye image, where the fisheye collage transformation generates a collage of different portions of the fisheye image. For example, the fisheye collage transformation may identify multiple regions in the fisheye image (considering multiple perspective transformations) and warp individual regions of the fisheye image to form a collage image. A machine learning algorithm or other algorithm can process the collage image in order to detect one or more objects in the scene and to detect a bounding box or other boundary around each object. The boundaries of the detected objects in the collage image can be transformed into boundaries in the original fisheye image and possibly into boundaries in a world coordinate frame. This process can be repeated for any number of fisheye images. Any other suitable operations may also occur involving the or more detected objects, such as tracking one or more objects around a vehicle and performing one or more actions involving the vehicle (like braking or accelerating the vehicle or changing the vehicle's direction of travel). In this way, it is possible to use one or more fisheye cameras in order to achieve improved or maximum fields of view while permitting computationally efficient processing of fisheye images.

FIG. 1 illustrates an example system 100 supporting a fisheye collage transformation for object detection according to this disclosure. In this particular example, the system 100 takes the form of an automotive vehicle, such as an electric vehicle. However, any other suitable system may support object detection based on a fisheye collage transformation, such as other types of vehicles, autonomous robots, or other autonomous or non-autonomous systems.

As shown in FIG. 1, the system 100 includes at least one processor 102 configured to control one or more operations of the system 100. In this example, the processor 102 may interact with one or more sensors 104 and with one or more components coupled to a bus 106. In this particular example, the one or more sensors 104 include one or more fisheye cameras or other imaging sensors, and the bus 106 represents a controller area network (CAN) bus. However, the processor 102 may interact with any additional sensor(s) and communicate over any other or additional bus(es).

The sensors 104 here include one or more fisheye cameras 104' that generate fisheye images of scenes around the system 100. The fisheye images are used by the processor 102 or other component(s) as described below to perform object detection. In some cases, the sensors 104 may include a single fisheye camera 104', such as one camera positioned on the front of a vehicle. In other cases, the sensors 104 may include multiple fisheye cameras 104', such as one camera positioned on the front of a vehicle, one camera positioned on the rear of the vehicle, and two cameras positioned on opposite sides of the vehicle.

The processor 102 can process the fisheye images from the one or more fisheye cameras 104' in order to detect objects around or proximate to the system 100, such as one or more vehicles, obstacles, or people near the system 100. The processor 102 can also process the fisheye images from the one or more fisheye cameras 104' in order to perceive lane-marking lines or other markings on a road, floor, or other surface. The processor 102 can further use various information to generate predictions associated with the system 100, such as to predict the future path(s) of the system 100 or other vehicles, identify a center of a lane in which the system 100 is traveling, or predict the future locations of objects around the system 100. Note that these or other functions may occur using the fisheye images from the one or more fisheye cameras 104', possibly along with other information from other types of sensors 104. For instance, other types of sensors 104 that may be used in the system 100 could include one or more radio detection and ranging (RADAR) sensors, light detection and ranging (LIDAR) sensors, other types of imaging sensors, or inertial measurement units (IMUs).

In this example, the processor 102 performs an object detection function 108, which generally involves identifying objects around the system 100 in a real-time manner. For example, the object detection function 108 can use images from one or more fisheye cameras 104' and optionally inputs from one or more other sensors 104 to identify external objects around the system 100, such as other vehicles moving around or towards the system 100 or pedestrians or objects near the system 100. The object detection function 108 can also identify one or more characteristics of each of one or more detected objects, such as an object class, an inferred 3D object structure, and a bounding box or other boundary around the detected object. As noted in FIG. 1, the object detection function 108 supports the use of a fisheye collage transformation, which can transform each of one or more fisheye images into an image collage where different portions of the image collage represent different transformed portions of the fisheye image. In some embodiments, the object detection function 108 may use a trained machine learning algorithm, computer vision algorithm, or other algorithm to identify objects and characteristics of the identified objects.

The processor 102 also performs a sensor fusion function 110, which generally involves combining measurements from different sensors 104 and/or combining information about the same objects from the object detection function 108. For example, the sensor fusion function 110 may combine estimated locations of the same object determined using images or other data from multiple sensors 104. The sensor fusion function 110 may combine measurements from different sensors 104 and/or information derived based on measurements from different sensors 104 in any suitable manner as needed or desired.

Information from the sensor fusion function 110 (and possibly information from one or more other sources) may be provided to a decision planning function 112, which generally uses this information to determine how to adjust the operation of the system 100. For example, in an automotive vehicle, the decision planning function 112 may determine whether (and how) to change the steering direction of the vehicle, whether (and how) to apply the brakes or accelerate the vehicle, or whether (and how) to trigger an audible, visible, haptic, or other warning. The warning may indicate that the system 100 is near another vehicle, obstacle, or person, is departing from a current lane in which the vehicle is traveling, or is approaching a possible impact location with another vehicle, obstacle, or person. In general, the identified adjustments determined by the decision planning function 112 can vary widely based on the specific application.

The decision planning function 112 can interact with one or more control functions 114, each of which can be used to adjust or control the operation of one or more actuators 116 in the system 100. For example, in an automotive vehicle, the one or more actuators 116 may represent one or more brakes, electric motors, or steering components of the vehicle, and the control function(s) 114 can be used to apply or discontinue application of the brakes, speed up or slow down the electric motors, or change the steering direction of the vehicle. In general, the specific way(s) in which detected objects can be used may vary depending on the specific system 100 in which object detection is being used.

Note that the functions 108-114 shown in FIG. 1 and described above may be implemented in any suitable manner in the system 100. For example, in some embodiments, various functions 108-114 may be implemented or supported using one or more software applications or other software instructions that are executed by at least one processor 102. In other embodiments, at least some of the functions 108-114 can be implemented or supported using dedicated hardware components. In general, the functions 108-114 described above may be performed using any suitable hardware or any suitable combination of hardware and software/firmware instructions.

The processor 102 itself may also be implemented in any suitable manner, and the system 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108-114 described above. This may allow, for instance, the processor(s) 102 to be used to process multiple images and other sensor data in parallel.

Although FIG. 1 illustrates one example of a system 100 supporting a fisheye collage transformation for object detection, various changes may be made to FIG. 1. For example, various functions and components shown in FIG. 1 may be combined, further subdivided, replicated, omitted, or rearranged and additional functions and components may be added according to particular needs. Also, as noted above, the functionality for object detection may be used in any other suitable system, and the system may or may not relate to automotive vehicles or other vehicles.

Figure 2:
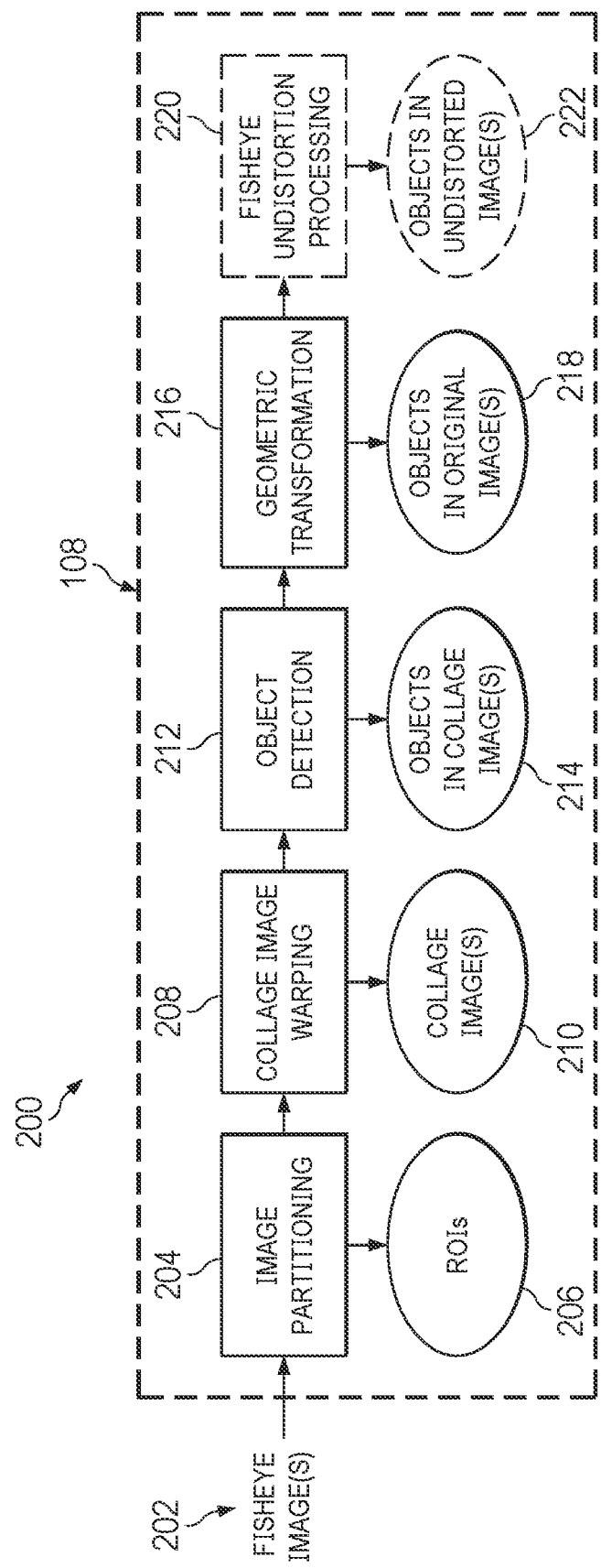
FIG. 2 illustrates an example architecture supporting a fisheye collage transformation for object detection according to this disclosure.

FIG. 2 illustrates an example architecture 200 supporting a fisheye collage transformation for object detection according to this disclosure. More specifically, the example architecture 200 shown in FIG. 2 may be used to implement the object detection function 108 described above. For ease of explanation, the architecture 200 of FIG. 2 is described as being used in the system 100 of FIG. 1. However, the architecture 200 of FIG. 2 may be used in any other suitable device or system, such as any other suitable device or system supporting or using object detection.

Figure 3:
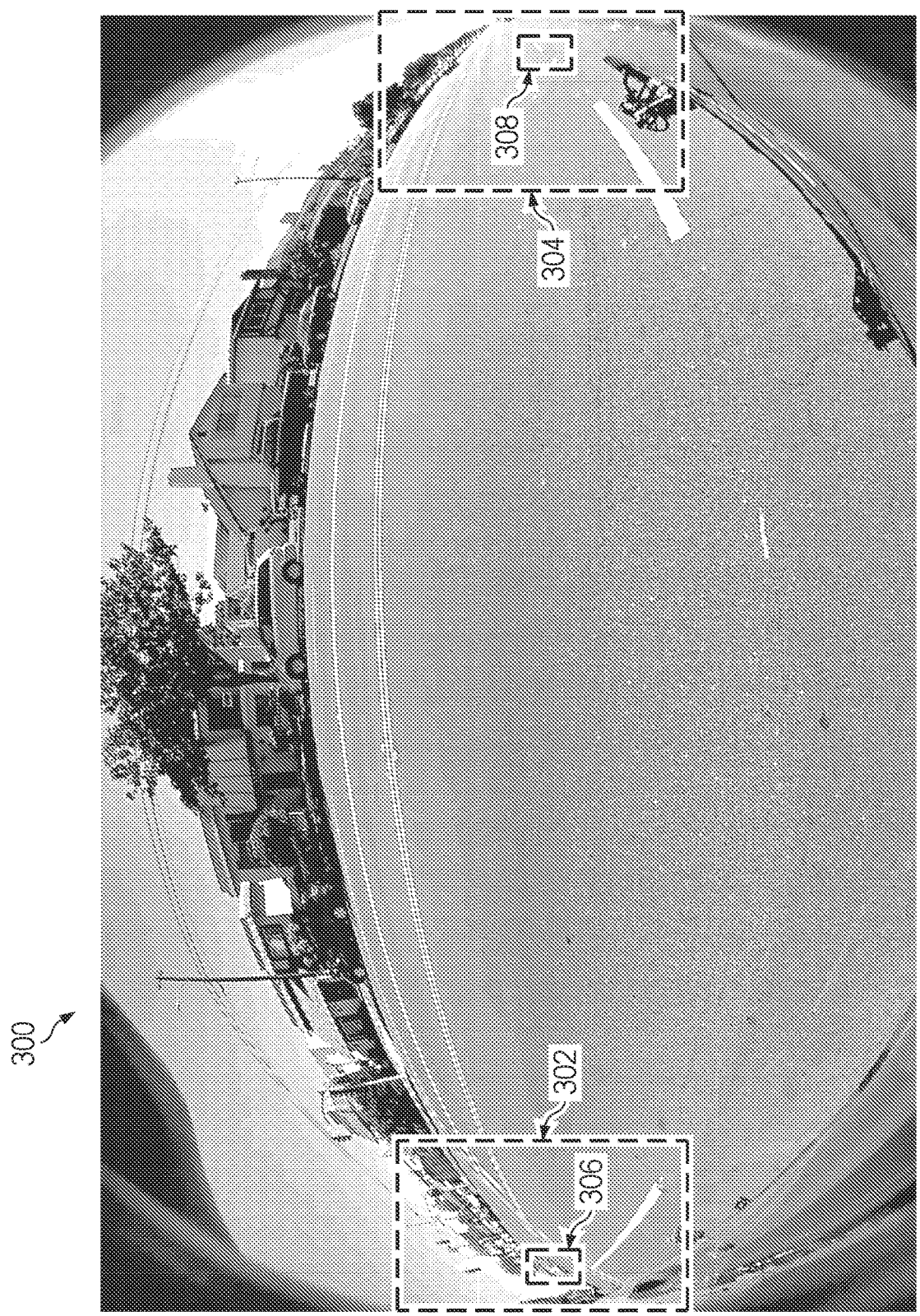
FIG. 3 illustrates an example fisheye image for use in object detection using a fisheye collage transformation according to this disclosure.

As shown in FIG. 2, the architecture 200 receives at least one input fisheye image 202, such as one or more fisheye images captured using one or more fisheye cameras 104'. For example, the at least one input fisheye image 202 may be captured using one or more fisheye cameras 104' positioned on the front, rear, and/or side(s) of a vehicle. Note that if multiple fisheye images 202 are received, the fisheye images 202 may represent discrete images or images captured as part of a video sequence. FIG. 3 illustrates an example fisheye image 300 for use in object detection using a fisheye collage transformation according to this disclosure. As shown in FIG. 3, the fisheye image 300 captures an image of a street, where there are vehicles straight ahead in the image 300 and other vehicles traveling in both directions along the street. Even though the street here is relatively straight and includes relatively straight lane-marking lines, the use of a fisheye lens creates large optical distortions in the image 300.

The object detection function 108 includes an image partitioning function 204, which generally operates to partition or divide each fisheye image 202 and identify different regions of interest (ROIs) 206 in the fisheye image(s) 202. The image partitioning function 204 can use any suitable technique to partition fisheye images 202 and identify regions of interest 206, such as by identifying one or more areas of a fisheye image 202 that appear to contain one or more objects. Each region of interest 206 may be defined in any suitable manner. For example, in some embodiments, each region of interest 206 may be defined as a rectangular region in a fisheye image 202. In other embodiments, each region of interest 206 may be defined as an arbitrary polygon in a fisheye image 202. In these types of embodiments, each region of interest 206 can be represented using a collection of coordinates $(x_1, y_1), (x_2, y_2), \ldots, (x_k, y_k)$ (where $k \geq 3$) to define a rectangular region or arbitrary polygon. Depending on the embodiment, it may be possible for multiple regions of interest 206 to overlap with one another. As a particular example, one region of interest 206 may be defined in a fisheye image 202, and a most relevant portion, a central portion, or other portion of that region of interest 206 may itself be defined as another region of interest 206.

In the example of the fisheye image 300 shown in FIG. 3, the image partitioning function 204 may determine that two regions of interest 302 and 304 are located on opposite sides of the fisheye image 300. These two regions of interest 302 and 304 may be selected, for example, since they can capture vehicles that might be approaching the system 100 from the left and right of the fisheye camera 104'. The image partitioning function 204 may also determine that two regions of interest 306 and 308 are respectively defined within the regions of interest 302 and 304. These two regions of interest 306 and 308 may be selected, for instance, as being the most relevant portions of the regions of interest 302 and 304, such as when the regions of interest 306 and 308 are defined in the middle of the driving lane closest to the system 100. In this way, the image partitioning function 204 identifies a set of four regions of interest 302-308 to be processed further as described below.

Figure 4B:

The object detection function 108 also includes a collage image warping function 208, which generally operates to warp one or more portions of the fisheye image(s) 202 (such as one or more identified regions of interest 206) in order to produce a collage image 210 for each fisheye image 202. Each collage image 210 represents a collection or collage of different portions of the associated fisheye image 202, where one or more desired transformations and/or rotations can be applied to one or more of the portions of the associated fisheye image 202. In some embodiments, the collage image warping function 208 uses an original fisheye image 202 to generate a collage image 210 that includes (i) an undistorted version of a central portion of the original fisheye image 202 and (ii) one or more warped versions of one or more regions of interest 206. An undistorted version of a central portion of a fisheye image 202 may be generated as shown in FIGS. 4A and 4B. Warped versions of regions of interest 206 may be generated as shown in FIGS. 5A and 5B.

FIGS. 4A and 4B illustrate an example transformation for isolating a central portion of a fisheye image 300 during a fisheye collage transformation for object detection according to this disclosure. As shown in FIG. 4A, the fisheye image 300 has been transformed into an image 400, and a central portion 402 of the image 400 is identified in FIG. 4A. As shown in FIG. 4B, the image 400 can be cropped to include only the central portion 402, thereby forming an undistorted image 404. As can be seen here, the undistorted image 404 represents the central portion of the fisheye image 300 as modified so that, for example, the lane-marking lines appear generally straight (as expected for this particular scene). Note that the term "undistorted" in this document does not require that an image contain no visual distortions. Rather, the term "undistorted" indicates that an operation has been applied in order to at least partially remove visual distortions.

In some embodiments, the processor 102 may generate the undistorted image 404 using the "OpenCV" technique for undistorting fisheye images. This technique is described at the following website: https://docs.opencv.org/3.4/db/d58/group_calib3d_fisheye.html (which is hereby incorporated by reference in its entirety). Note, however, that any other suitable technique may be used to process a fisheye image and produce an undistorted image of at least a central portion or other portion of the fisheye image.

Figure 5A:
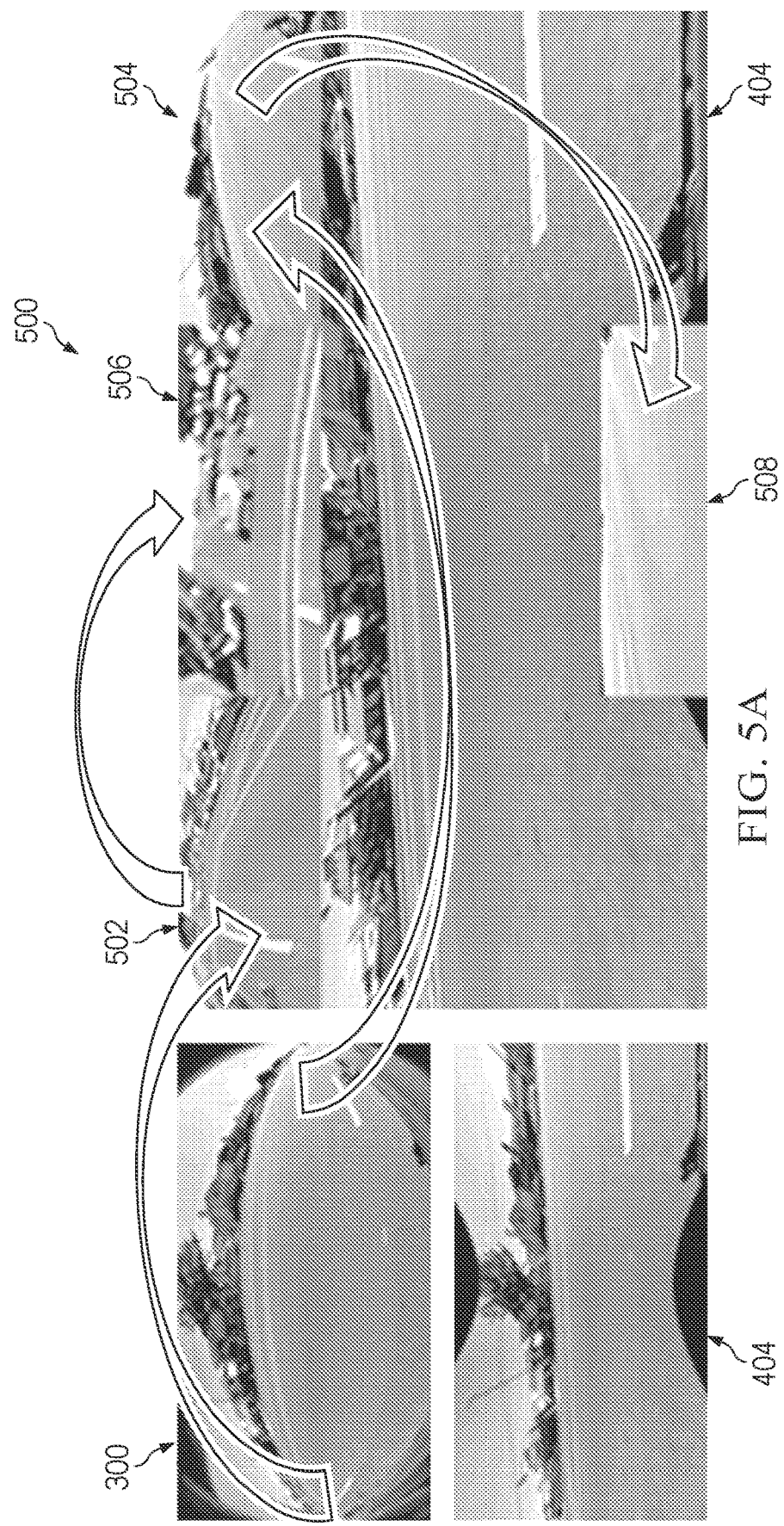
FIGS. 5A and 5B illustrate an example fisheye collage transformation for object detection according to this disclosure.
Figure 5B:
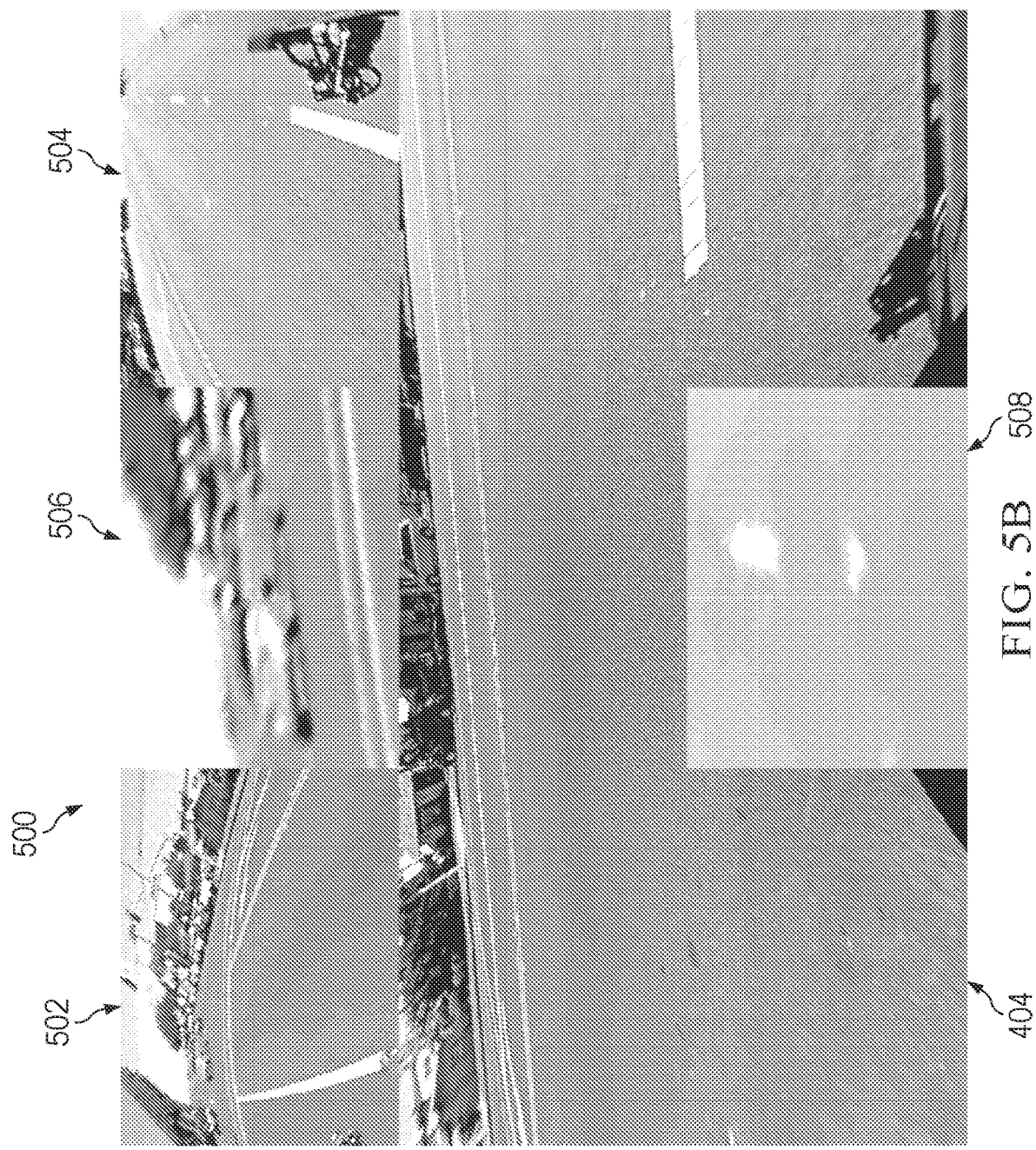

FIGS. 5A and 5B illustrate an example fisheye collage transformation for object detection according to this disclosure. As shown in FIG. 5A, the region of interest 302 in the fisheye image 300 has been transformed into a transformed region 502, and the region of interest 304 in the fisheye image 300 has been transformed into a transformed region 504. Also, the region of interest 306 (which can be contained within the transformed region 502) has been transformed into a transformed region 506, and the region of interest 308 (which can be contained within the transformed region 504) has been transformed into a transformed region 508. The transformed regions 502-508 can contain the image data from the region of interests 302-308, although the image data can be modified (such as via transformation and/or rotation). Collectively, the undistorted image 404 and the transformed regions 502-508 can form a collage image 500, which may represent a collage image 210 generated by the collage image warping function 208 shown in FIG. 2. The collage image 500 is shown in larger detail in FIG. 5B.

In some embodiments, the transformation and rotation of image data in a region of interest into image data in a transformed region may occur as follows. As noted above, a region of interest can be defined by a set of coordinates $(x_1, y_1), (x_2, y_2), \ldots, (x_k, y_k)$ (where $k \geq 3$), and the processor 102 can identify these coordinates as part of the image partitioning function 204. The processor 102 can also identify a set of coordinates $(x_1', y_1'), (x_2', y_2'), \ldots, (x_k', y_k')$ (where $k \geq 3$) for a target region corresponding to the region of interest, where the target region represents the space in a collage image 210 in which a transformed region is defined. A target region can be defined for each region of interest, so $T_m$ may be said to represent the target region corresponding to a specific region of interest $R_m$. Given these assumptions, it is possible to define a perspective transformation between each region of interest $R_m$ and its corresponding target region $T_m$. After defining the perspective transformations, each region of interest $R_m$ can be transformed into the corresponding target region $T_m$ based on a set of pixel transformations.

In particular embodiments, a perspective transformation can be defined using a 3×3 transformation matrix M as follows:

$$q = M \times p \qquad (1)$$

where q and p respectively represent a target point ($q=[u', v', 1]'$) in a target region $T_m$ and a source point ($p=[u, v, 1]'$) in a region of interest $R_m$ as defined using a homogeneous coordinate system. It is possible to define an ordered set of points in the target region $T_m$ (Q) and a corresponding set of points in the region of interest $R_m$ (P). Given that, each column in Q has an $n^{th}$ point defined as $Q[:,n]=[x_n, y_n, 1]'$ (where $n=1, \ldots, k$), and P can have the same structure. As a result, Equation (1) can be extended as follows:

$$Q = M \times p \qquad (2)$$

Since the matrix P is not a square matrix, the 3×3 transformation matrix M can be computed by a pseudo-inverse in some embodiments, such as in the following manner:

$$M = (Q \times P' \times (P \times P')^{-1})^\dagger \qquad (3)$$

Here, $P^\backslash$ represents the pseudo-inverse of P, and $P^{-1}$ represents the inverse matrix of P. In this way, forward or backward warping may be used to transform between each region of interest $R_m$ and its corresponding target region $T_m$. In some cases, the computational complexity of the image warping here can be O(N) (where N is the number of pixels), which can easily be within the computational capabilities of vehicle processors 102 or other available devices.

As can be seen in the fisheye image 300 of FIG. 3, the fisheye image 300 provides a wide field of view, but it is difficult to detect objects because of the fisheye image distortion. For example, vehicles on the left and right sides of the fisheye image 300 are rotated and not upright, and this can make it difficult to apply machine learning algorithms or other algorithms that perform object detection. As a particular example, a deep convolutional neural network (CNN) may require a more complex architecture or more training data in order to classify objects that are not upright in images. Moreover, relative sizes of objects in the central portion of the fisheye image 300 and in the peripheral areas of the fisheye image 300 differ, which again can make it difficult to classify the objects in the fisheye image 300. The undistorted image 404 produced as shown in FIGS. 4A and 4B can clearly show objects captured in part of the fisheye image 300, but large portions of the fisheye image 300 are missing in the undistorted image 404. The collage image 500 allows different portions of the fisheye image 300 to be obtained that cover a wider range (possibly all) of the entire scene captured in the fisheye image 300. The transformations and rotations applied to the regions of interest 302-308 in the fisheye image 300 in order to form the transformed regions 502-508 can provide for the appropriate scales and rotations of pixel data so that all images in the collage image 500 can have the same or substantially the same orientation (even if at different scales).

Returning to FIG. 2, the collage image(s) 210 produced by the collage image warping function 208 can be processed by an object detection function 212, which generally operates to analyze the collage image(s) 210 and identify one or more objects 214 captured in the collage image(s) 210. The object detection function 212 may use any suitable technique to identify objects in the collage image(s) 210, such as a machine learning algorithm or a computer vision algorithm. In some embodiments, for example, the object detection function 212 may use the object detection techniques disclosed in Ren et al., "Faster R-CNN: Towards Real-Time Object Detection with Region Proposal Networks," IEEE Transactions on Pattern Analysis and Machine Intelligence, Vol. 39, Issue 6, June 2017 (which is hereby incorporated by reference in its entirety). However, any other suitable object detection technique may be used by the object detection function 212.

Among other things, the object detection function 212 can identify locations of target objects in a collage image space, which represents the image space of the collage image(s) 210. In some cases, these object locations can be represented as rectangular bounding boxes around the target objects, although other boundaries of the target objects may be identified. The object detection function 212. may also identify a corresponding class for each detected target object, such as person or vehicle. Thus, in some embodiments, the object detection function 212 may identify both a boundary for each detected target object and a classification of each detected target object. In particular embodiments, a bounding box B for each detected target object may be defined using four two-dimensional (2D) points within a collage image 210, so the bounding box B can be expressed as:

$$B=([x_{(1,1)}, y_{(1,1)}, x_{(1,2)}, y_{(1,2)}], [x_{(2,1)}, y_{(2,1)}, x_{(2,2)}, y_{(2,2)}], \ldots [x_{(4,1)}, y_{(4,1)}, x_{(4,2)}, y_{(4,2)}]) \quad (4)$$

Note that these points are expressed relative to a collage image 210 rather than to an original fisheye image 202.

A geometric transformation function 216 generally operates to transform the coordinates of bounding boxes or other boundaries of detected target objects in each collage image 210 into boundaries within the associated fisheye image 202 in which the detected target objects were captured. This leads to the identification of one or more objects 218 captured in the original fisheye image(s) 202. The geometric transformation function 216 may use any suitable technique to transform coordinates between image spaces. For example, as described above, a transformation matrix M can be used to map image data from a source point p to a target point q. Thus, after obtaining the object detection results, it is possible to identify a point (q=[u', v', 1]') in the fisheye image 202 corresponding to a point (p=[u, v, 1]') in the corresponding collage image 210 using an inverse transformation. This can be expressed as:

$$q=M^{-1} \times p \quad (5)$$

Equation (5) can be used for each point defining a boundary of a detected target object in a collage image 210 in order to identify the corresponding boundary of the same detected target object in a fisheye image 202.

Optionally, a fisheye undistortion processing function 220 may be used to convert the boundaries of the detected target objects in the fisheye images 202 into boundaries of the target objects in corresponding undistorted images. This can be done, for example, to convert the boundaries of the detected target objects into a world coordinate frame. This leads to the identification of one or more objects 222 captured in the undistorted image(s). The fisheye undistortion processing function 220 may use any suitable technique to convert boundaries of detected target objects, such as the "OpenCV" technique.

In the approach described here, each collage image 210 can be used to cover much or all of the scene as captured in a corresponding fisheye image 202. Each collage image 210 thereby allows object detection to be performed, and the object detection results can be transformed back to the original fisheye image space for further image processing. A collage transformation can provide appropriate scales and rotations for the regions of interest 206 when generating the collage images 210, which can increase or maximize the chances of successful object detection. For example, since the collage transformation can provide rotations to make the different regions of interest 206 appear upright in the collage images 210, the object detection function 212 can implement deep learning-based object detection or other form of object detection without changing the architecture of the object detection function 212 and without requiring additional training data (such as training data containing rotated vehicles, obstacles, and people). Moreover, the transformed regions 502-508 can include higher resolutions as needed so that smaller objects within the fisheye images 202 can be detected more easily.

Note that the functions 204, 208, 212, 216, 220 shown in FIG. 2 and described above may be implemented in any suitable manner. For example, in some embodiments, various functions 204, 208, 212, 216, 220 may be implemented or supported using one or more software applications or other software instructions that are executed by at least one processor 102 or other device(s). In other embodiments, at least some of the functions 204, 208, 212, 216, 220 can be implemented or supported using dedicated hardware components. In general, the functions 204, 208, 212, 216, 220 described above may be performed using any suitable hardware or any suitable combination of hardware and software/firmware instructions.

Although FIG. 2 illustrates one example of an architecture 200 supporting a fisheye collage transformation for object detection and FIGS. 3 through 5B illustrate example images used during a fisheye collage transformation, various changes may be made to FIGS. 2 through 5B. For example, various functions shown in FIG. 2 may be combined, further subdivided, replicated, omitted, or rearranged and additional functions may be added according to particular needs. Also, FIGS. 3 through 5B are meant to provide one example of how a fisheye image may be processed as part of a fisheye collage transformation in order to perform object detection. Of course, images of other scenes may be captured and processed in the same or similar manner to perform object detection for those other scenes.

Figure 6:
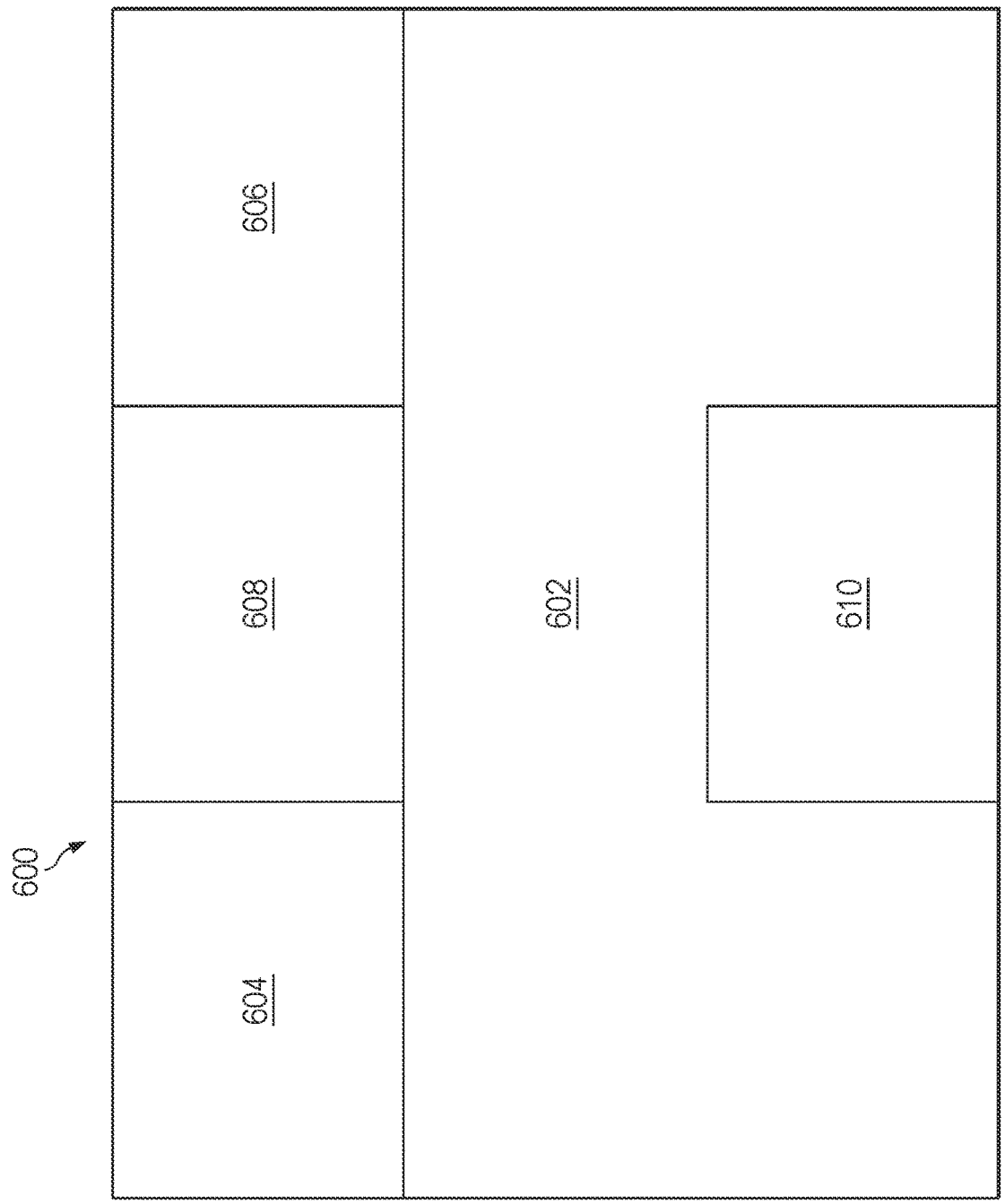
FIG. 6 illustrate an example fisheye collage image format for object detection according to this disclosure.

FIG. 6 illustrates an example fisheye collage image format 600 for object detection according to this disclosure. The image format 600 here may, for example, represent the format used to generate the collage images 210, 500 described above. As shown in FIG. 6, the image format 600 includes an area 602, which may be occupied by the undistorted central portion (or other portion) of a fisheye image. The image format 600 also includes areas 604-610, which represent target regions corresponding to regions of interest from the fisheye image. In the example shown in FIGS. 5A and 5B, the area 602 corresponds to the undistorted image 404, and the areas 604-610 respectively correspond to the transformed regions 502-508 representing the transformed versions of the regions of interest 302-308. Here, the regions of interest 302-308 can be transformed to produce the transformed regions 502-508 based on the defined locations of the areas 604-610 in the image format 600.

As a particular example of this, assume that an input fisheye image 202 has a resolution of 1920×1208 and that the image format 600 for a collage image 210 has the same resolution. Also, assume that the areas 604-610 respectively correspond to the transformed regions 502-508 representing the transformed versions of the regions of interest 302-308. In the following discussion, the area 604 may be denoted T1, the area 608 may be denoted T2, the area 606 may be denoted T3, and the area 610 may be denoted T4. Within a collage image 210 having the image format 600, these four areas 604-610 may be defined as having the following homogeneous coordinates.

$$T1 = \begin{matrix} 1 & 640 & 640 & 1 \\ 1 & 1 & 400 & 400 \\ 1 & 1 & 1 & 1 \end{matrix}$$

$$T2 = \begin{matrix} 640 & 1280 & 1280 & 640 \\ 1 & 1 & 400 & 400 \\ 1 & 1 & 1 & 1 \end{matrix}$$

$$T3 = \begin{matrix} 1280 & 1920 & 1920 & 1280 \\ 1 & 1 & 400 & 400 \\ 1 & 1 & 1 & 1 \end{matrix}$$

$$T4 = \begin{matrix} 640 & 1280 & 1280 & 640 \\ 808 & 808 & 1208 & 1208 \\ 1 & 1 & 1 & 1 \end{matrix}$$

Also, assume that the four regions of interest 302-308 in the original fisheye image 202 may be denoted S1, S2, S3, S4 and may be defined as having the following homogeneous coordinates.

$$S1 = \begin{matrix} -20 & 160 & 380 & 130 \\ 637 & 410 & 610 & 920 \\ 1 & 1 & 1 & 1 \end{matrix}$$

$$S2 = \begin{matrix} 20 & 70 & 115 & 76 \\ 636 & 624 & 665 & 725 \\ 1 & 1 & 1 & 1 \end{matrix}$$

$$S3 = \begin{matrix} 1760 & 1940 & 1790 & 1540 \\ 410 & 637 & 920 & 610 \\ 1 & 1 & 1 & 1 \end{matrix}$$

$$S4 = \begin{matrix} 1850 & 1900 & 1844 & 1805 \\ 624 & 636 & 725 & 665 \\ 1 & 1 & 1 & 1 \end{matrix}$$

Given these assumptions, the mapping from source points (pixels of S1-S4) to target points (pixels of T1-T4) can be expressed as:

$$H = T1 \times S1' \times (S1 \times S1')^{-1} \qquad (6)$$

This allows the regions of interest 302-308 to be transformed and rotated in order to generate the transformed regions 502-508 in the areas 604-610 of the collage image 210. An inverse mapping can be expressed as:

$$H^{-1} = \text{inv}(H) \qquad (7)$$

This allows boundaries or other points identified in the transformed regions 502-508 to be converted back into boundaries or other points in the original fisheye image 202.

Although FIG. 6 illustrate one example of a fisheye collage image format 600 for object detection, various changes may be made to FIG. 6. For example, the number of areas 602-610 can vary, such as based on the number of transformed regions 502-508 (which itself can vary based on the number of identified regions of interest 206 in a fisheye image 202). Also, the positions of the areas 604-610 can vary from those shown in FIG. 6. In addition, while the areas 604-610 are shown here as overlapping the area 602, this does not necessarily mean that image data in the area 602 is lost. Rather, this simply indicates that the areas 602-610 collectively form an image collage, image data for the individual areas 602-610 may be stored separately or together, and the areas 602-610 may be rearranged in an overlapping or non-overlapping manner as needed or desired.

Figure 7:
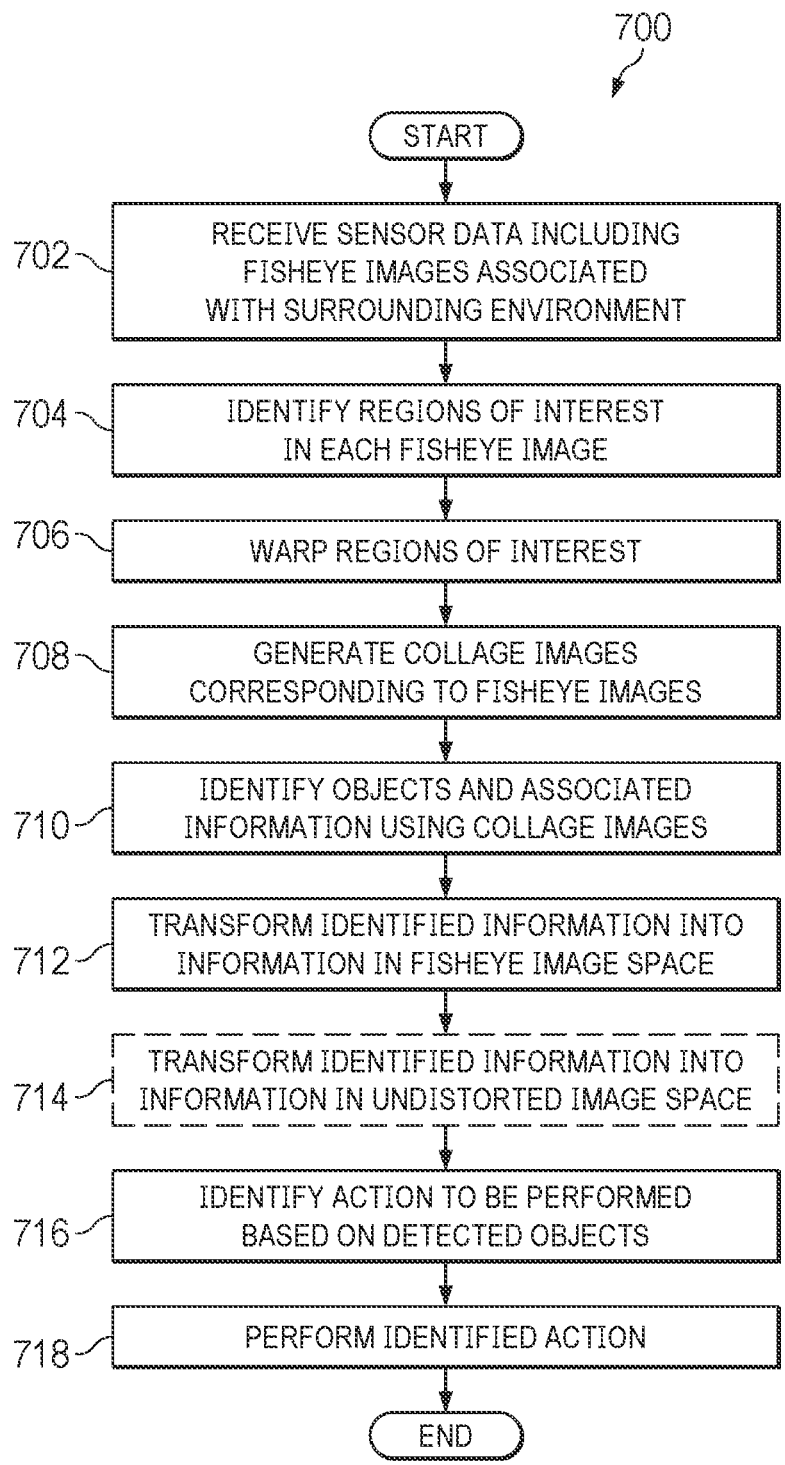
FIG. 7 illustrates an example method for object detection using a fisheye collage transformation according to this disclosure.

FIG. 7 illustrates an example method 700 for object detection using a fisheye collage transformation according to this disclosure. For ease of explanation, the method 700 of FIG. 7 is described as being performed in the system 100 of FIG. 1 using the object detection function 108 of FIG. 2. However, the method 700 may involve the use of any other suitable device in any other suitable system.

As shown in FIG. 7, sensor data associated with an environment is received at step 702. This may include, for example, the processor 102 of the system 100 receiving one or more fisheye images 202 from one or more fisheye cameras 104'. The processor 102 may also receive any additional types of data from any other suitable types of sensors 104. One or more regions of interest are identified in each fisheye image at step 704. This may include, for example, the processor 102 performing the image partitioning function 204 in order to identify regions of interest 206 in each fisheye image 202.

The regions of interest in the one or more fisheye images are warped at step 706, and one or more collage images corresponding to the one or more fisheye images are generated at step 708. This may include, for example, the processor 102 performing the collage image warping function 208 to identify a target region (such as an area 604-610) in a collage image 210 for each identified region of interest 206. This may also include the processor 102 identifying, for each region of interest 206, a perspective transformation for transforming pixel data in that region of interest 206 into pixel data in the associated target region in a collage image 210 and applying the perspective transformations to the regions of interest 206 in order to produce transformed regions 502-508. This may further include the processor 102 identifying, for each fisheye image 202, an undistorted image 404 based on a central portion or other portion of a transformed image. In addition, this may include the processor 102. combining the various images (such as one or more undistorted images 404 and various transformed regions 502-508) according to the image format 600 to produce one or more collage images 210.

One or more objects and associated information about the object(s) are identified using the one or more collage images at step 710. This may include, for example, the processor 102 performing the object detection function 212 to identify one or more target objects in each collage image 210 and to identify a bounding box or other boundary around each target object. The identified information is transformed from collage image space into fisheye image space at step 712. This may include, for example, the processor 102 performing the geometric transformation function 216 to transform coordinates of one or more bounding boxes or other boundaries around one or more target objects from the image space of the collage images 210 into the image space of the fisheye images 202. Optionally, the identified information is also transformed into undistorted image space at step 714. This may include, for example, the processor 102 performing the fisheye undistortion processing function 220 to transform coordinates of one or more bounding boxes or other boundaries around one or more target objects into an image space associated with a world coordinate frame.

The one or more identified objects and the associated object information may be used in any suitable manner. For example, the one or more identified objects and associated object information may be used to identify at least one action to be performed at step 716, and the at least one action can be performed at step 718. This may include, for example, the processor 102 identifying and initiating one or more actions in response to detecting one or more objects or one or more specific characteristics of the object(s). As a particular example, the processor 102 may determine that the system 100 is predicted to strike another vehicle, person, or object or that another vehicle is predicted to strike the system 100. Any suitable action(s) may be taken here, such as changing a steering direction of the vehicle, applying the brakes or accelerating the vehicle, or triggering an audible, visible, haptic, or other warning.

Although FIG. 7 illustrates one example of a method 700 for object detection using a fisheye collage transformation, various changes may be made to FIG. 7. For example, while shown as a series of steps, various steps in FIG. 7 may overlap, occur in parallel, occur in a different order, or occur any number of times.

Note that many functional aspects o the embodiments described above can be implemented using any suitable hardware or any suitable combination of hardware and software/firmware instructions. In some embodiments, at least some functional aspects of the embodiments described above can be embodied as software instructions that are executed by one or more unitary or multi-core central processing units or other processing device(s). In other embodiments, at least some functional aspects of the embodiments described above can be embodied using one or more application specific integrated circuits (ASICs). When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 8:
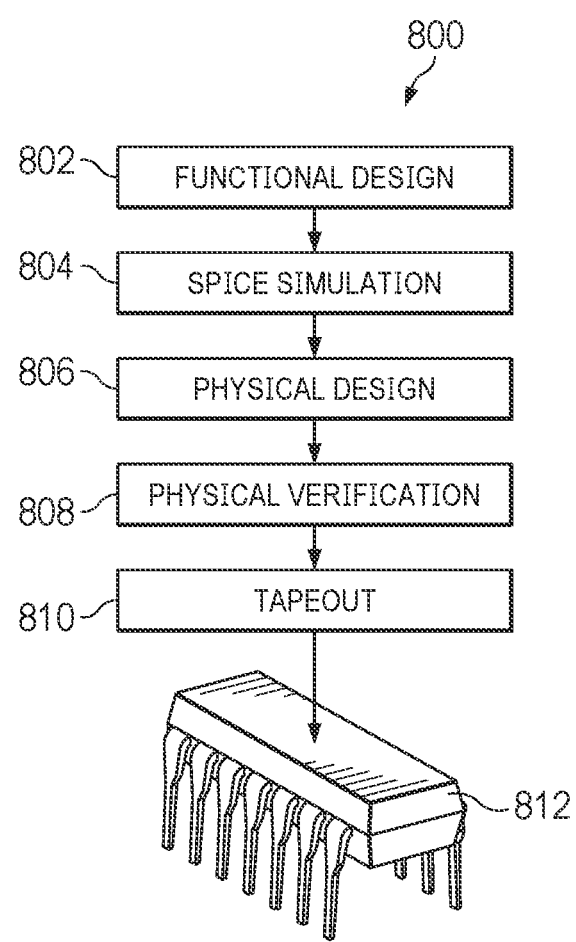
FIG. 8 illustrates an example design flow for employing one or more tools to design hardware that implements one or more functions according to this disclosure.

FIG. 8 illustrates an example design flow 800 for employing one or more tools to design hardware that implements one or more functions according to this disclosure. More specifically, the design flow 800 here represents a simplified ASIC design flow employing one or more EDA tools or other tools for designing and facilitating fabrication of ASICs that implement at least some functional aspects of the various embodiments described above.

As shown in FIG. 8, a functional design of an ASIC is created at step 802. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 804. This may include, for example, using the SPICE simulations or other simulations to verify that the functional design of the ASIC performs as expected.

A physical design of the ASIC is created based on the validated data structures and other aspects of the functional design at step 806. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 808. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 810. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 812.

Although FIG. 8 illustrates one example of a design flow 800 for employing one or more tools to design hardware that implements one or more functions, various changes may be made to FIG. 8. For example, at least some functional aspects of the various embodiments described above may be implemented in any other suitable manner.

Figure 9:
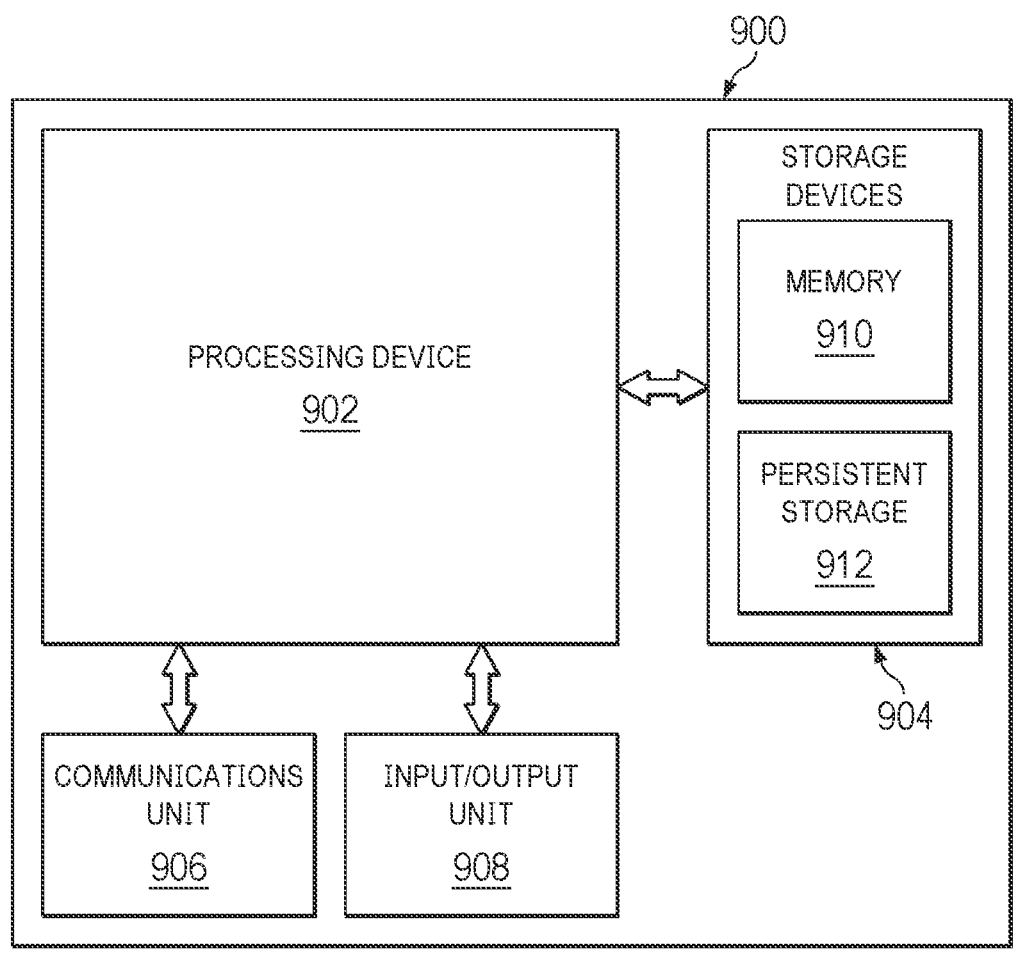
FIG. 9 illustrates an example device supporting execution of one or more tools to design hardware that implements one or more functions according to this disclosure.

FIG. 9 illustrates an example device 900 supporting execution of one or more tools to design hardware that implements one or more functions according to this disclosure. The device 900 may, for example, be used to implement at least part of the design flow 800 shown in FIG. 8. However, the design flow 800 may be implemented in any other suitable manner.

As shown in FIG. 9, the device 900 denotes a computing device or system that includes at least one processing device 902, at least one storage device 904, at least one communications unit 906, and at least one input/output (I/O) unit 908. The processing device 902 may execute instructions that can be loaded into a memory 910. The processing device 902 includes any suitable number(s) and type(s) of processors or other processing devices in any suitable arrangement. Example types of processing devices 902 include one or more microprocessors, microcontrollers, DSPs, ASICs, FPGAs, or discrete circuitry.

The memory 910 and a persistent storage 912 are examples of storage devices 904, which represent any structure(s) capable of storing and facilitating retrieval of information (such as data, program code, and/or other suitable information on a temporary or permanent basis). The memory 910 may represent a random access memory or any other suitable volatile or non-volatile storage device(s). The persistent storage 912 may contain one or more components or devices supporting longer-term storage of data, such as a read only memory, hard drive, Flash memory, or optical disc.

The communications unit 906 supports communications with other systems or devices. For example, the communications unit 906 can include a network interface card or a wireless transceiver facilitating communications over a wired or wireless network. The communications unit 906 may support communications through any suitable physical or wireless communication link(s).

The I/O unit 908 allows for input and output of data. For example, the I/O unit 908 may provide a connection for user input through a keyboard, mouse, keypad, touchscreen, or other suitable input device. The I/O unit 908 may also send output to a display or other suitable output device. Note, however, that the I/O unit 908 may be omitted if the device 900 does not require local I/O, such as when the device 900 represents a server or other device that can be accessed remotely.

The instructions that are executed by the processing device 902 include instructions that implement at least part of the design flow 800. For example, the instructions that are executed by the processing device 902 may cause the processing device 902 to generate or otherwise obtain functional designs, perform simulations, generate physical designs, verify physical designs, perform tape-outs, or create/use photomasks (or any combination of these functions). As a result, the instructions that are executed by the processing device 902 support the design and fabrication of ASIC devices or other devices that implement one or more functions described above.

Although FIG. 9 illustrates one example of a device 900 supporting execution of one or more tools to design hardware that implements one or more functions, various changes may be made to FIG. 9. For example, computing and communication devices and systems come in a wide variety of configurations, and FIG. 9 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining a fisheye image of a scene around a vehicle;
    identifying multiple regions of interest in the fisheye image;
    applying one or more transformations to transform and rotate one or more of the regions of interest in the fisheye image to produce one or more transformed regions;
    generating a collage image comprising at least one portion based on the fisheye image and one or more portions containing the one or more transformed regions; and
    performing object detection to identify one or more objects captured in the collage image;
    wherein the multiple regions of interest comprise different portions of the fisheye image that are identified as potentially containing one or more objects of interest; and
    wherein at least one region of interest identified as potentially containing at least one object of interest is located within another region of interest identified as potentially containing the at least one object of interest and includes a driving lane closest to the vehicle.

2. The method of claim 1, wherein:
    the at least one portion of the collage image based on the fisheye image comprises an undistorted version of a central portion of the fisheye image; and
    the one or more portions of the collage image containing the one or more transformed regions comprise one or more transformed and rotated regions of interest having substantially a same orientation as the undistorted version of the central portion of the fisheye image.

3. The method of claim 2, wherein the undistorted version of the central portion of the fisheye image and the one or more transformed regions have different scales.

4. The method of claim 1, wherein the collage image contains multiple transformed regions associated with two or more of the multiple regions of interest in the fisheye image, the two or more regions of interest located on opposite sides of the fisheye image.

5. The method of claim 1, wherein the collage image contains multiple transformed regions associated with two or more of the multiple regions of interest in the fisheye image.

6. The method of claim 1, wherein:
    multiple fisheye images are obtained and multiple regions of interest are identified in each of the fisheye images;
    a collage image is generated for each of the fisheye images; and
    the collage images have a common format, the common format including an area for an undistorted version of a central portion of each fisheye image and multiple areas for multiple transformed regions associated with the multiple regions of interest in each fisheye image.

7. The method of claim 1, wherein performing object detection comprises performing object detection using a machine learning algorithm that has not been trained using rotated versions of objects.

8. The method of claim 1, further comprising:
    identifying a boundary associated with each of the one or more objects in the collage image.

9. The method of claim 8, further comprising at least one of:
    translating the boundary of each of the one or more objects from a collage image space to a fisheye image space; and
    translating the boundary of each of the one or more objects from the collage image space to an undistorted image space.

10. The method of claim 1, further comprising:
    identifying at least one action based on the one or more objects; and
    performing the at least one action.

11. The method of claim 10, wherein the at least one action comprises at least one of:
    an adjustment to at least one of: a steering of the vehicle, a speed of the vehicle, an acceleration of the vehicle, and a braking of the vehicle; and
    an activation of an audible, visible, or haptic warning.

12. An apparatus comprising:
    at least one processor configured to:
        obtain a fisheye image of a scene around a vehicle;
        identify multiple regions of interest in the fisheye image;
        apply one or more transformations to transform and rotate one or more of the regions of interest in the fisheye image to produce one or more transformed regions;
        generate a collage image comprising at least one portion based on the fisheye image and one or more portions containing the one or more transformed regions; and
        perform object detection to identify one or more objects captured in the collage image;
    wherein the at least one processor is configured to identify different portions of the fisheye image that potentially contain one or more objects of interest as the multiple regions of interest; and
    wherein at least one region of interest identified as potentially containing at least one object of interest is located within another region of interest identified as potentially containing the at least one object of interest and includes a driving lane closest to the vehicle.

13. The apparatus of claim 12, wherein:
    the at least one portion of the collage image based on the fisheye image comprises an undistorted version of a central portion of the fisheye image; and
    the one or more portions of the collage image containing the one or more transformed regions comprise one or more transformed and rotated regions of interest having substantially a same orientation as the undistorted version of the central portion of the fisheye image.

14. The apparatus of claim 13, wherein the undistorted version of the central portion of the fisheye image and the one or more transformed regions have different scales.

15. The apparatus of claim 12, wherein the collage image contains multiple transformed regions associated with two or more of the multiple regions of interest in the fisheye image, the two or more regions of interest located on opposite sides of the fisheye image.

16. The apparatus of claim 12, wherein the collage image contains multiple transformed regions associated with two or more of the multiple regions of interest in the fisheye image.

17. The apparatus of claim 12, wherein:
the at least one processor is configured to obtain multiple fisheye images and identify multiple regions of interest in each of the fisheye images;
the at least one processor is configured to generate a collage image for each of the fisheye images; and
the collage images have a common format, the common format including an area for an undistorted version of a central portion of each fisheye image and multiple areas for multiple transformed regions associated with the multiple regions of interest in each fisheye image.

18. The apparatus of claim 12, wherein, to perform object detection, the at least one processor is configured to use a machine learning algorithm that has not been trained using rotated versions of objects.

19. The apparatus of claim 12, wherein the at least one processor is further configured to identify a boundary associated with each of the one or more objects in the collage image.

20. The apparatus of claim 19, wherein the at least one processor is further configured to at least one of:
translate the boundary of each of the one or more objects from a collage image space to a fisheye image space; and
translate the boundary of each of the one or more objects from the collage image space to an undistorted image space.

21. The apparatus of claim 12, wherein the at least one processor is further configured to:
identify at least one action based on the one or more objects; and
perform the at least one action.

22. The apparatus of claim 21, wherein the at least one action comprises at least one of:
an adjustment to at least one of: a steering of the vehicle, a speed of the vehicle, an acceleration of the vehicle, and a braking of the vehicle; and
an activation of an audible, visible, or haptic warning.

23. A non-transitory machine-readable medium containing instructions that when executed cause at least one processor to:
obtain a fisheye image of a scene around a vehicle;
identify multiple regions of interest in the fisheye image;
apply one or more transformations to transform and rotate one or more of the regions of interest in the fisheye image to produce one or more transformed regions;
generate a collage image comprising at least one portion based on the fisheye image and one or more portions containing the one or more transformed regions; and
perform object detection to identify one or more objects captured in the collage image;
wherein the instructions that when executed cause the at least one processor to identify the multiple regions of interest in the fisheye image comprise:
instructions that when executed cause the at least one processor to identify different portions of the fisheye image that potentially contain one or more objects of interest as the multiple regions of interest; and
wherein at least one region of interest identified as potentially containing at least one object of interest is located within another region of interest identified as potentially containing the at least one object of interest and includes a driving lane closest to the vehicle.

24. The non-transitory machine-readable medium of claim 23, wherein:
the at least one portion of the collage image based on the fisheye image comprises an undistorted version of a central portion of the fisheye image; and
the one or more portions of the collage image containing the one or more transformed regions comprise one or more transformed and rotated regions of interest having substantially a same orientation as the undistorted version of the central portion of the fisheye image.

25. The non-transitory machine-readable medium of claim 24, wherein the undistorted version of the central portion of the fisheye image and the one or more transformed regions have different scales.

26. The non-transitory machine-readable medium of claim 23, wherein the collage image contains multiple transformed regions associated with two or more of the multiple regions of interest in the fisheye image, the two or more regions of interest located on opposite sides of the fisheye image.

27. The non-transitory machine-readable medium of claim 23, wherein the collage image contains multiple transformed regions associated with two or more of the multiple regions of interest in the fisheye image.

28. The non-transitory machine-readable medium of claim 23, wherein:
the instructions when executed cause the at least one processor to obtain multiple fisheye images, identify multiple regions of interest in each of the fisheye images, and generate a collage image for each of the fisheye images; and
the collage images have a common format, the common format including an area for an undistorted version of a central portion of each fisheye image and multiple areas for multiple transformed regions associated with the multiple regions of interest in each fisheye image.

29. The non-transitory machine-readable medium of claim 23, wherein the instructions that when executed cause the at least one processor to perform object detection comprise:
instructions that when executed cause the at least one processor to use a machine learning algorithm that has not been trained using rotated versions of objects.

30. The non-transitory machine-readable medium of claim 23, wherein the instructions when executed further cause the at least one processor to identify a boundary associated with each of the one or more objects in the collage image.

31. The non-transitory machine-readable medium of claim 30, wherein the instructions when executed further cause the at least one processor to:
translate the boundary of each of the one or more objects from a collage image space to a fisheye image space; and
translate the boundary of each of the one or more objects from the collage image space to an undistorted image space.

32. The non-transitory machine-readable medium of claim 23, wherein the instructions when executed further cause the at least one processor to:
   identify at least one action based on the one or more objects; and
   perform the at least one action.

33. The non-transitory machine-readable medium of claim 32, wherein the at least one action comprises at least one of:
   an adjustment to at least one of: a steering of the vehicle, a speed of the vehicle, an acceleration of the vehicle, and a braking of the vehicle; and
   an activation of an audible, visible, or haptic warning.

* * * * *